UNITED STATES PATENT OFFICE.

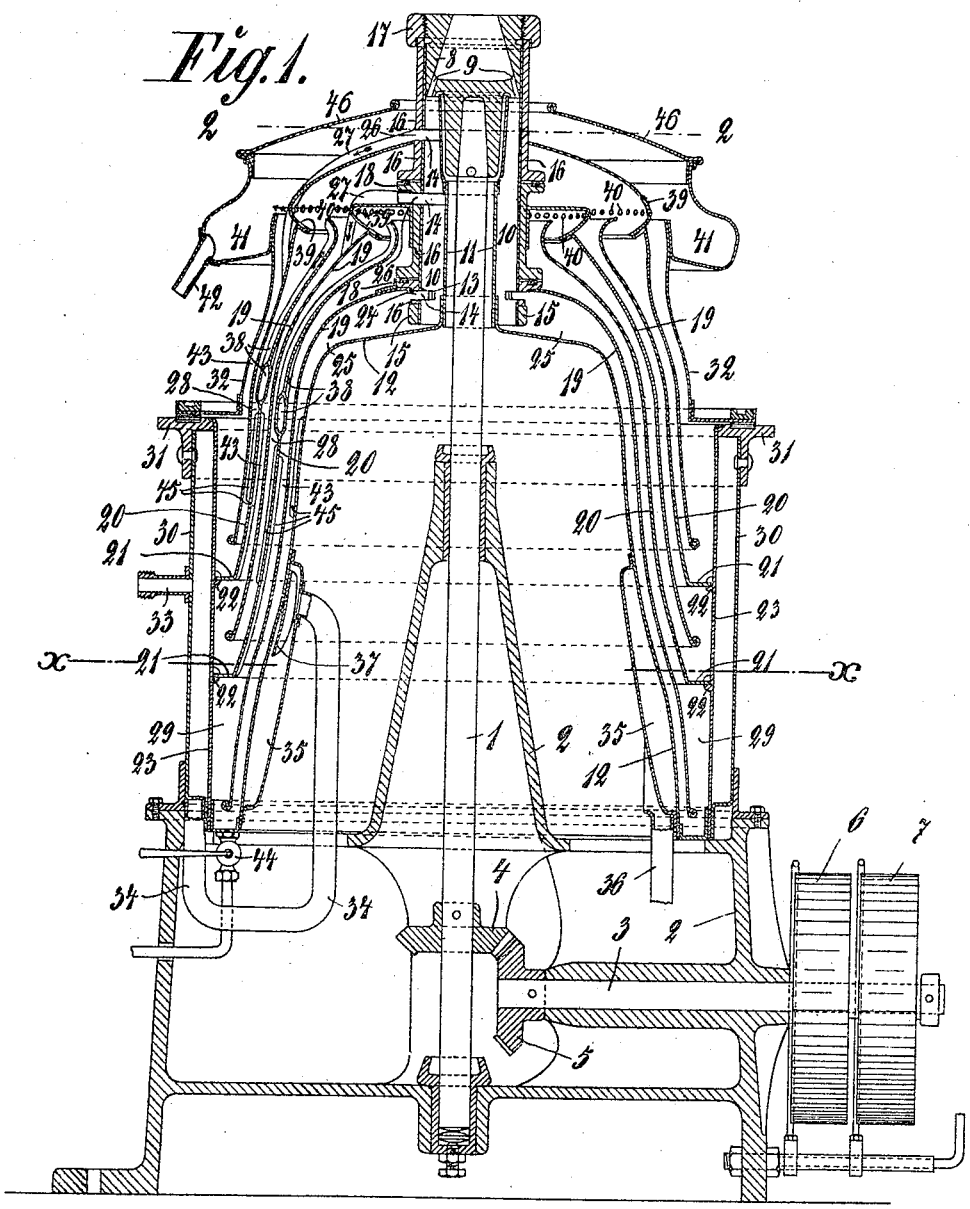

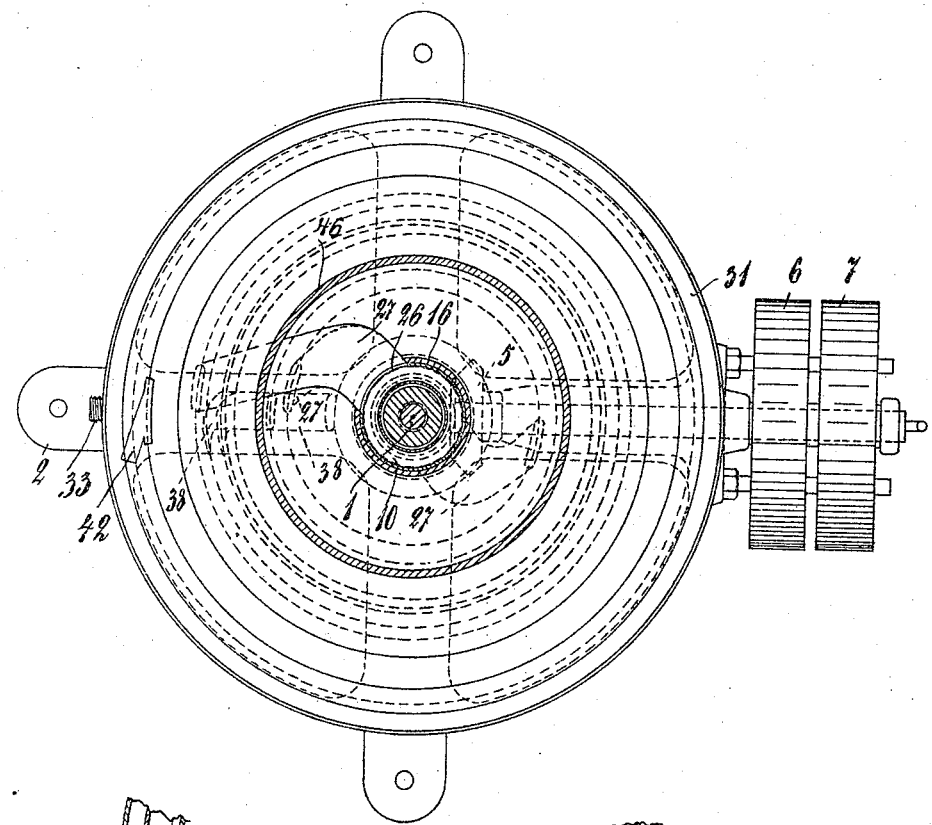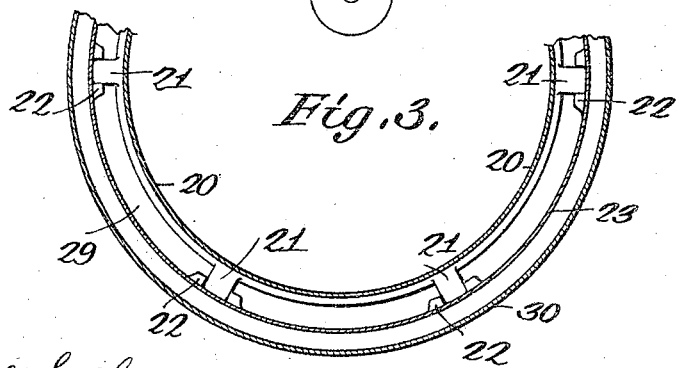

CARL WILHELM RAMSTEDT, OF TRANBYGGE, KUNGSÄNGEN, SWEDEN.

REGENERATIVE STERILIZING APPARATUS.

950,304.      Specification of Letters Patent.      Patented Feb. 22, 1910.

Application filed May 23, 1908. Serial No. 434,473.

*To all whom it may concern:*

Be it known that I, CARL WILHELM RAMSTEDT, a subject of the King of Sweden, and resident of Tranbygge, Kungsängen, in the Kingdom of Sweden, have invented certain new and useful Improvements in Regenerative Sterilizing Apparatus, of which the following is a specification, reference being had therein to the accompanying drawings.

In sterilizing apparatus hitherto used or proposed and consisting of a plurality of stationary and rotating vessels or partitions nested with each other alternately with intermediate spaces, through which the liquid to be sterilized passes, the said liquid leaves the apparatus after having passed downward along the one side of the rotating vessels respectively and upward along the other side of the said vessels, during which passage the liquid comes into contact with and is heated by the wall of a heating element. Consequently, the liquid is divided into separated portions, passing through the apparatus, which results in the liquid as a whole being non-uniformly heated and the sterilizing operation being non-uniform. The fact that the vessels differ in width and, consequently, the liquid portions pass through the apparatus with different speed and subjected to different pressures, also contributes to make the sterilizing operation uneven. Further, the said difference in pressure makes necessary the provision of tightening means between the stationary vessels at the bottom parts thereof. In sterilizing apparatus arranged in accordance with my invention the said disadvantages are overcome by making all the spaces between the stationary and rotating vessels, which, preferably, are bell-shaped and nested one above the other, open outwardly toward a common chamber outside of which a heating element is provided. Owing to the said arrangement the liquid portions passing from the several spaces are mixed with each other and the whole liquid mass is substantially heated to the same degree. The vessels are preferably so arranged, that the outer edges of the same are situated at the same or substantially the same distance from the rotary axis of the apparatus and above or substantially above each other. The said common chamber as well as the heating element inclosing the same will then have a vertical position, in consequence whereof the apparatus takes up a small space.

Figure 1 of the accompanying drawings is a vertical section of an apparatus arranged in accordance with this invention. Fig. 2 is a cross section on the line 2 to 2 in Fig. 1, and Fig 3 is a partial cross section on the line $x, x$, Fig. 1, showing the manner in which the stationary bell-shaped vessels are supported.

1 is a shaft journaled in the frame 2. The said shaft is rotated by a shaft 3 by means of bevel gears 4 5, the said shaft being provided with a belt pulley 6 and an idler pulley 7.

8 is the ordinary inlet cup for the liquid to be sterilized, fixed to the top end of the shaft 1. The liquid passes from the said cup through openings 9 provided in its bottom, downward into the space 10 between a tube 11 surrounding the shaft 1 and secured to the lowermost stationary vessel 12, and a tube 13, concentric with the tube 11 and fixed to the cup 8. The tube 13 is provided with a plurality of outlet openings 14 for the liquid. To the lower end of the tube 13 a ring 15 is fixed and on the tube 13 there are rings 16 one above and supporting the other, which rings 16 are held on the tube 13 by a nut 17 in screw-threaded engagement with the cup 8 or otherwise.

18 are packing rings provided between the rings 16.

To the rings 16 vessels 19 are fixed in any suitable manner. Consequently the said vessels 19 rotate with the shaft 1.

As seen from the drawings the vessels 12 and 19 are substantially bell-shaped and between the rotating vessels 19 and spaced therefrom are stationary vessels 20 which also are bell-shaped. The said vessels 20 are provided with spaced apart lateral projections 21 on their lower peripheries, by means of which they are supported in suitable manner by lugs 22, provided on the inner side of a vertical wall 23 inclosing the apparatus and connected at its bottom end with the bottom end of the vessel 12 forming the bottom wall of the apparatus. The vessels 12 19 and 20 are nested one into the other in spaced apart positions and the vessels 19, 20 are of the same dimensions, so that their outer edges are located one right above, or substantially above the other. In the lowermost ring 16 there is an opening 24 located opposite the opening 14, through which the liquid passes from the space 10 into the space 25 between the vessel 12 and the lowermost rotating vessel 19. In the other rings 16 there are openings 26 similar to the openings 24. 27, 27 are pipes, communicating with the said openings 26, 26 respectively and with the spaces 28, 28 between the outside of the stationary vessels 20, 20 respectively and the next outside rotating vessel 19. The wall 23 is located at some distance from the outer edges of the vessels 19, 20 in such manner, that between this wall and the said vessels there is a chamber 29 with which all spaces between the vessels communicate. A second wall 30 is located outside the wall 23 concentrically with and at some distance from the same, the said wall 30 being fixed to the frame 2. The walls 23, 30 are suitably connected at their bottom ends and a ring 31 connects them at their top ends. To the said ring 31 the uppermost stationary vessel 32 of the apparatus is fixed in any suitable, detachable manner. The walls 23 and 30 form together a heating device. A pipe 33 for steam or any other suitable heating medium communicates with the chamber between the walls. The said chamber communicates at its bottom end through a pipe 34 with a chamber 35, provided at the inner side of the wall 12 and extending around the same, said chamber also forming a heating device.

36 is the outlet pipe of the chamber 35.

37 is a shield, which prevents the steam, passing from the pipe 34 into the chamber 35, from heating the part of the wall 12 located in front of the outlet opening of the pipe 34 to a too high degree.

At the top ends of the stationary vessels 20 stripping-off pipes 38 are provided. The stripping-off pipes are similar to those employed in centrifugal liquid separators. The upper ends of the said pipes are bent outward toward trough-like, ring-shaped parts 39 at the top ends of the rotating vessels 19. The bottoms of the said troughs are directed outwardly and provided with outlet openings 40. At the top end of the vessel 32 a trough 41 is provided, in which sterilized liquid is received.

42 is the outlet pipe of the trough 41.

46 is the cover of the apparatus.

The apparatus operates in the following manner: The liquid passes from the cup 8 downward into the space 10 between the tubes 11 and 13 and then through the openings 14, 24 and the openings 14, 26 and the pipes 27 into the spaces 25, 28. In the said spaces the liquid, acted upon by the centrifugal force, is moved outwardly toward the periphery of the apparatus and passes from between the respective bell-shaped members into the chamber 29. From the said chamber the liquid is forced inwardly into the spaces 43 between the rotating vessels 19 and the stationary vessels 20 respectively, in which spaces it is stripped off by the pipes 38. From the said pipes the liquid passes into the troughs 39 and then through the openings 40 into the next outside trough 39 or 41 as the case may be. The liquid in the outermost space 43 passes over the top edge of the vessel 32 directly into the trough 41. The sterilized liquid leaves the apparatus through the pipe 42. While the liquid passes downward through the spaces 25, 28, 28, to the chamber 29, heat is transferred thereto from the liquid leaving the said chamber, said heat passing through the walls of the vessels, and consequently the apparatus is regenerative. The liquid is heated to the highest degree in the chamber 29, in which heat is transferred to the liquid from the surrounding steam containing heating medium hereinbefore described. To the part of the liquid passing through the space 25 heat is transferred also from the chamber 35. All the liquid must pass through the chamber 29 and in the said chamber the liquid currents leaving the spaces 25, 28, 28 are mixed together, which results in the liquid being uniformly heated and consequently the sterilizing operation is as uniform as possible. Owing to the described and shown arrangement of the vessels the chamber 29 and the heating device 23, 30 may have their greatest dimensions vertically, and consequently the apparatus will occupy a minimum space without its efficacy being reduced in any degree. As all the spaces between the vessels communicate at their lower ends, all tightening means between the vessels can evidently be dispensed with. The quantity of liquid led into the spaces 25, 28 to fill up the same is controlled by suitably adapting the size of the openings 14. In the bottom of the chamber 29 a cock 44 is provided, through which the liquid remaining in the apparatus when the sterilizing operation has been completed can be discharged.

45 are the ordinary flanges or ribs provided on the stationary vessels in order to prevent the liquid from fully partaking in the movement of the rotating vessels and thus to render substantially uniform the heat distributing operation through all the vessels.

The apparatus may evidently be used for the cooling of liquids, a cooling medium being for that purpose led into the chambers 23, 30 and 35 generally or for the interchanging of heat between fluids.

I claim as my invention:

1. In a liquid sterilizing apparatus and in combination, a plurality of stationary and intermediate rotating vessels, with their bottom edges located one substantially above the other, a vertical chamber provided around the said vessels and communicating with the spaces between the same, and a vertical chamber inclosing the aforesaid chamber, there being inlet passages between the stationary and rotating vessels at the tops thereof, and outlet passages in the upper portions of the said rotating vessels, substantially as described and for the purposes set forth.

2. In a liquid sterilizing apparatus and in combination, a plurality of stationary and intermediate rotating vessels, with their bottom edges located one substantially above the other, a vertical chamber provided around the said vessels and communicating with the spaces between the same, a vertical heating or cooling chamber inclosing the aforesaid chamber, and another chamber inside the innermost stationary vessel, there being inlet passages between the stationary and the rotating vessels at the upper portions thereof, and outlet passages at the upper ends of the said rotating vessels, substantially as described and for the purpose set forth.

3. In a sterilizing apparatus and in combination, a plurality of stationary and intermediate rotating vessels, with their bottom edges located one substantially above the other, a vertical chamber provided around the said vessels and communicating with the spaces between the same, a vertical chamber inclosing the aforesaid chamber, there being provided inlet passages between the stationary and the rotating vessels at the upper ends thereof, stripping-off pipes in the spaces between the vessels, outside the rotating vessels, and trough-like, ring shaped members at the tops of the rotating vessels, the said members being provided with perforated bottoms which are directed outwardly and which are located substantially concentrically, substantially as described and for the purpose set forth.

4. In a sterilizing apparatus and in combination, a plurality of bell-shaped, stationary and intermediate rotating vessels, with their bottom edges located one substantially above the other, a vertical chamber provided around the said vessels and communicating with the spaces between the same, a vertical chamber inclosing the aforesaid chamber, another chamber inside the innermost stationary vessel, a shaft upon which the rotating vessels turn, a central inlet chamber coaxial with the said shaft, there being passages connecting the last aforesaid chamber with the upper parts of the spaces between the said stationary and rotating vessels, stripping-off pipes in the spaces between the vessels and outside the rotating vessels, and trough-like, ring-shaped members in the upper portions of the rotating vessels, the bottoms of which are provided with perforations and are directed outwardly and are located substantially concentrically, substantially as described and for the purpose set forth.

In witness whereof, I have hereunto signed my name in the presence of two subscribing witnesses.

CARL WILHELM RAMSTEDT.

Witnesses:
HJALMAR ZETTERSTRÖM,
ROBERT APELGREN.